United States Patent
Gantner

(10) Patent No.: US 8,183,984 B2
(45) Date of Patent: May 22, 2012

(54) METHOD AND DEVICE FOR THE POWER-SAVING OPERATION OF A PLURALITY OF RFID DATA CARRIERS

(75) Inventor: Reinhold Gantner, Bludenz (AT)

(73) Assignee: Identec Solutions AG, Lustenau (AT)

( * ) Notice: Subject to any disclaimer, the term of this patent is extended or adjusted under 35 U.S.C. 154(b) by 854 days.

(21) Appl. No.: 12/179,466

(22) Filed: Jul. 24, 2008

(65) Prior Publication Data

US 2009/0027171 A1    Jan. 29, 2009

(30) Foreign Application Priority Data

Jul. 25, 2007  (DE) .................. 10 2007 034 593

(51) Int. Cl.
  *H04Q 5/22*    (2006.01)
  *H04Q 1/30*    (2006.01)
  *G08B 23/00*   (2006.01)
  *G08B 1/08*    (2006.01)

(52) U.S. Cl. ............ 340/10.33; 340/10.34; 340/10.41; 340/7.34; 340/539.3; 340/517; 455/343.4

(58) Field of Classification Search ...... 340/10.2–10.34, 340/572.1, 572.4, 539.22–539.29, 10.41, 340/517–526, 584–588
See application file for complete search history.

(56) References Cited

U.S. PATENT DOCUMENTS

| | | | |
|---|---|---|---|
| 5,686,902 A * | 11/1997 | Reis et al. ................. | 340/10.2 |
| 2005/0030160 A1 | 2/2005 | Goren et al. | |
| 2006/0202804 A1 | 9/2006 | Vijay-Pillai et al. | |
| 2007/0016944 A1 | 1/2007 | Hansen | |

FOREIGN PATENT DOCUMENTS

| | | |
|---|---|---|
| DE | 19601959 A1 | 7/1997 |
| DE | 19801124 A1 | 7/1999 |
| DE | 10060581 A1 | 6/2002 |
| DE | 102004004257 A1 | 8/2005 |

OTHER PUBLICATIONS

Search Report from the German Patent and Trademark Office, 4 pages (Dec. 7, 2007).

* cited by examiner

*Primary Examiner* — Benjamin C Lee
*Assistant Examiner* — Omeed Alizada
(74) *Attorney, Agent, or Firm* — The Maxham Firm

(57) ABSTRACT

A method and a device for power-saving operation of a plurality of RFID data carriers, whereby the RFID data carrier has a transmission and reception antenna, by way of which data are sent to and received from a read/write unit, by means of a radio signal, and the data carrier is configured for reception of an energy-saving signal that puts the data carrier into a so-called sleep mode. The read/write unit sends a so-called conditional sleep command to all the RFID data carriers, and the RFID data carriers receiving these data in the transmission field compare the transmitted condition with a status/data detected in the RFID data carrier, whereby the condition detected in the RFID data carrier depends on a sensor input that is connected with the RFID data carrier. The transmission of the signals between the read/write unit and the data carrier is formed by means of a transmission/reception antenna disposed on the read/write device, and a correspondingly disposed transmission and reception antenna disposed on the data carrier.

17 Claims, 3 Drawing Sheets

METHOD AND DEVICE FOR THE POWER-SAVING OPERATION OF A PLURALITY OF RFID DATA CARRIERS

FIELD OF THE INVENTION

The invention relates to a method and a device for power-saving operation of a plurality of RFID data carriers.

BACKGROUND OF THE INVENTION

It is known to put RFID (Radio Frequency Identification—contact-free data transmission by radio signal) data carriers into a power-saving sleep mode, as is evident, for example, from German patent publication 10 2004 004 257 A1. There, however, only a single RFID data carrier is put into sleep mode, in the case of a transponder locking system, with the goal of saving the corresponding battery power. The same criticism furthermore also applies to German patent publications 198 01 124 A1 and 196 01 959 A1.

However, when administering a plurality of RFID data carriers, which are affixed to goods in a warehouse, for example, it is not possible through the use of known prior art to allow power-saving operation for a plurality of RFID data carriers.

SUMMARY OF THE INVENTION

The invention is therefore based on the task of allowing power-saving operation even in the case of a plurality of RFID data carriers that are situated under the transmission field and reception field of a read/write unit.

A characteristic of the invention is that a plurality of RFID data carriers is disposed in the transmission and reception field of a read/write unit, and that it is supposed to be made possible, in the case of this plurality of RFID data carriers, that these data carriers have only a very slight power consumption. Furthermore, it is supposed to be made possible that not all the data carriers, but rather only a selected few of the data carriers, communicate with the read/write unit.

The method according to the present invention is therefore accomplished in that the read/write unit sends a so-called conditional sleep command to all the RFID data carriers, and the RFID carriers that receive this data in the transmission field compare the sent condition with a status datum detected in each RFID data carrier, whereby this condition detected in the RFID data carrier depends on a sensor input that is connected with each RFID data carrier.

Therefore, the given technical teaching results in the advantage that the read/write unit only sends a so-called conditional sleep command, that is, the sleep command is sent to all the RFID data carriers situated in the reception and transmission field, but only those RFID data carriers at which the condition is met go into the power-saving sleep mode for a specific period of time. In the case of all the other RFID data carriers, at which the transmitted condition is not met, the RFID data carriers remain in the awake state and can then receive other commands.

Therefore, pre-filtering of a plurality of RFID data carriers situated in the transmission and reception field of a read/write unit is achieved with this conditional sleep command, because only those carriers at which a specific pre-determined condition is not met remain in the awake state. As an example, let it be stated here that a plurality of products is stored in a warehouse, and each product, that is, the product packaging, is connected with an RFID data carrier, whereby each RFID data carriers is connected with a temperature sensor. The temperature signals are constantly but cyclically detected and evaluated by the RFID data carrier. Now a conditional sleep command comes from the read/write unit, specifically in such a form that all the data carriers (for example out of a number of 1,000 data carriers) that have a temperature of less than 30° Celsius are supposed to go into sleep mode for a specific period of time. With this, the result is achieved that of the 1,000 addressed RFID data carriers, for example, 950 data carriers go into sleep mode, and 50 data carriers remain awake.

In a further method step, additional commands are then sent to the 50 data carriers that have remained awake, for example, that these data carriers are supposed to transmit their identification number, that they are supposed to transmit their temperature, and also the location at which the data carrier is situated.

This is only a simple example that is intended to explain the advantages of the conditional sleep command. Of course, the conditional sleep command is not determined solely as a function of an ambient variable. Such ambient variables can be, for example, temperature, moisture, shock or movement, influence of light, noise, smoke or foreign gases, a GPS coordinate, a time change or a digital input or an analog input to which one or more switching pulses are applied, which pulses are switched in contact-free or mechanical manner. Likewise, sound sensors, proximity sensors, or rotary position transducers can be disposed at the sensor inputs.

It is important that all the RFID data carriers have essentially the same sensor input and accordingly also react to the conditional sleep command in the same manner; this command can be, for example, that all the data carriers that have "seen light" are to remain awake, while all the others are to go to sleep.

Of course, RFID data carriers can also be disposed in a warehouse in groups, where the carriers monitor different sensor inputs, by group. One group can monitor light sensors, for example, a second group can monitor noise sensors, a third group can monitor moisture sensors, and a fourth group can monitor temperature sensors.

Another advantage of the invention lies in the fact that now, the data transmission from the RFID data carriers in the direction to the read/write unit is significantly increased, because now, only a total of 50 data carriers has to be queried, in comparison with the formerly 1,000 data carriers.

Furthermore, in a further development of the present invention, it can be provided that a separate read/write unit is provided for each group, and that these read/write units transmit sequentially, that is, not all at the same time, but rather consecutively, for example.

Likewise, it is possible that a single read/write unit issues a plurality of different conditional sleep commands, which are dependent, for example, on temperature, moisture, speed, or the like, whereby the telegram sent, in each instance, which contains the conditional sleep command, is evaluated by the RFID data carriers that monitor precisely this sensor input.

BRIEF DESCRIPTION OF THE DRAWING

Embodiments of the invention will be explained in greater detail using the attached drawing figures that represent merely one method of implementation, wherein.

DETAILED DESCRIPTION OF THE PREFERRED EMBODIMENTS

Figure 1:
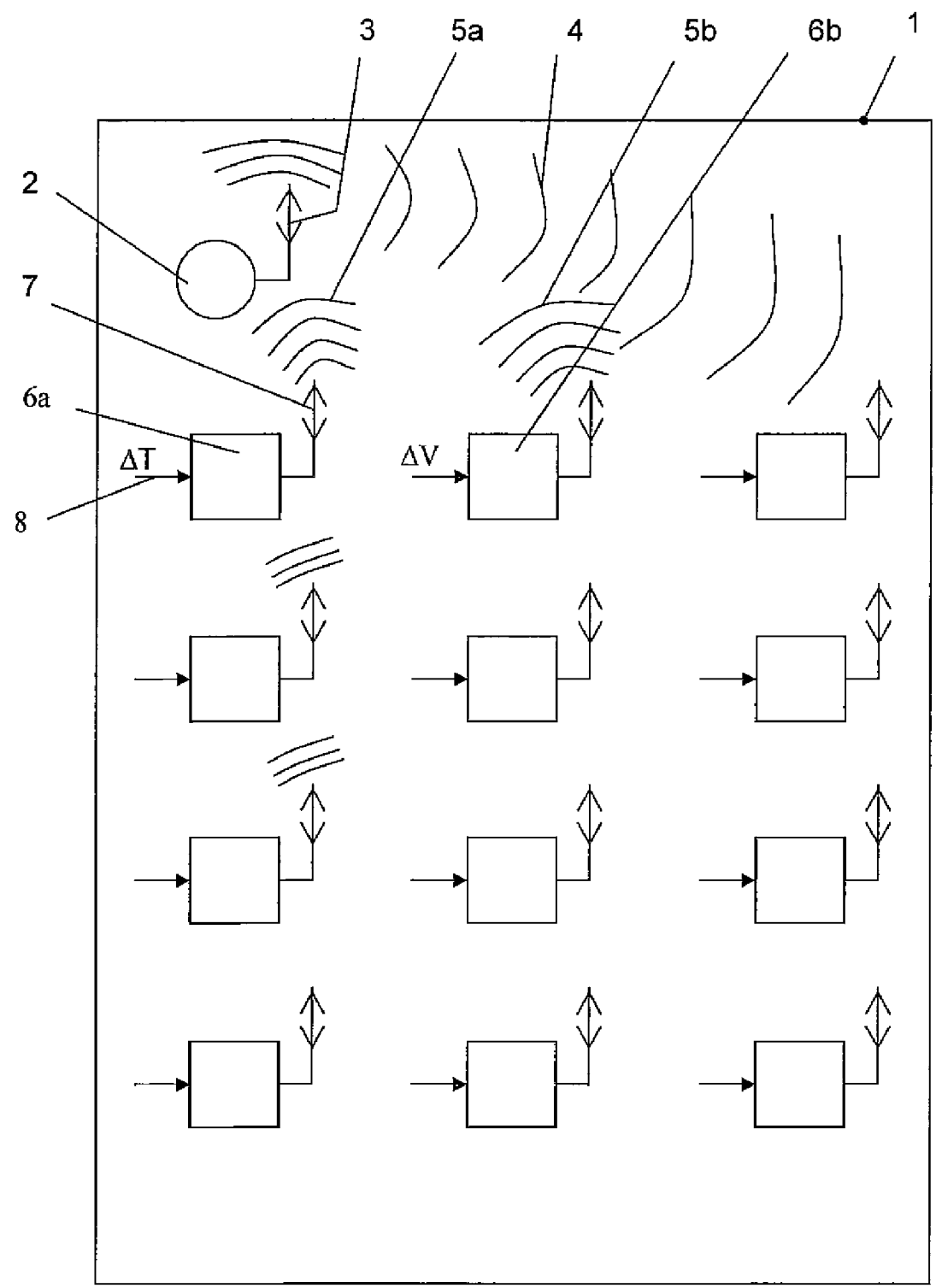
FIG. 1 schematically shows a warehouse having a plurality of data carriers situated in it.

FIG. 1 shows a warehouse 1, in general, as an example, with read/write unit 2 disposed within it, which transmits a corresponding transmission field 4 and also reacts to reception fields 5a, 5b of a plurality of data carriers 6a, 6b disposed in the warehouse. For this reason, the read/write unit has a corresponding transmission and reception antenna 3, and each data carrier 6 also has a related transmission and reception antenna 7.

Each data carrier 6 has an input at which a sensor 8 is disposed. As an example, let it be stated that data carrier 6a monitors a temperature change, $\Delta T$, data carrier 6b monitors a change in velocity or speed, $\Delta V$, and other data carriers may monitor other sensors of various types.

Figure 2:
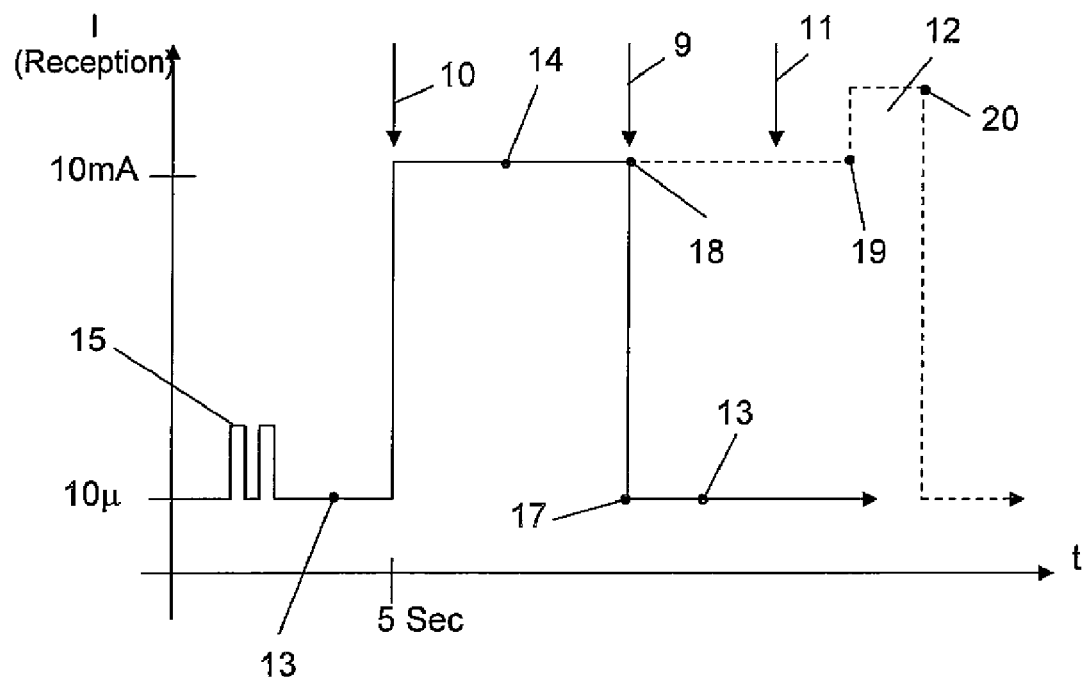
FIG. 2 is a current diagram of a data carrier in the transmission mode and in the sleep mode.

It is desirable that power-saving operation be achieved, as will be explained in greater detail with respect to FIG. 2. In this connection, it is presupposed that at first, all the data carriers 6 situated in the warehouse are in so-called sleep mode 13, whereby proceeding from the sleep mode, a reception mode 15 (also called sniff mode) takes place. This means that at a power consumption of about 10 µA in the sleep mode, for example, the receiver of the data carrier goes to reception for a very short period of time of about 100 µs, for example, and goes into the reception mode 15 when it does so.

As a next method step, a wake-up signal 10 is sent to all the data carriers 6, and they therefore all go into the awake mode 14.

In this state (awake mode 14), all the data carriers 6 have the capability of receiving additional commands, including a conditional sleep command 9. If a conditional sleep command 9 is now received within a specific period of time, an investigation is carried out internally within data carrier 6, whether the conditional sleep command agrees with the sensor condition. If it agrees, that is, if no unnatural monitoring state exists, the data carrier goes into sleep mode, whereby there are multiple embodiments for this.

In a first embodiment, it is provided that after conditional sleep command 9 is received at position 17, data carrier 6 goes into the unconditional sleep mode for a period of 2 seconds, for example. This time period can be selected, and no wake-up is possible during this time.

In another embodiment, it can be provided that the unconditional sleep mode is not achieved, but instead, the reception mode 15 (sniff mode) is carried out over a specific period of time.

At a data carrier where the sensor yields an undesirable measurement value, for example, an undesirably high temperature or an undesirably low temperature, incident light, a noise, an undesirably high moisture, or the like, conditional sleep command 9 does not lead to the result that sleep mode 13 is entered into at position 17, hut rather the data carrier remains in awake mode 14 at position 18, and can receive a status query 11 from the read/write unit 2 in this region. It responds with a status response 12 at position 19, which again is evaluated by read/write unit 2. Afterwards, data carrier 6 can go into the unlimited sleep mode at position 20.

Again, there are two possibilities here, that an unlimited sleep mode is maintained for a specific period of time, or that the so-called sniff mode 15 is carried out.

Figure 3:
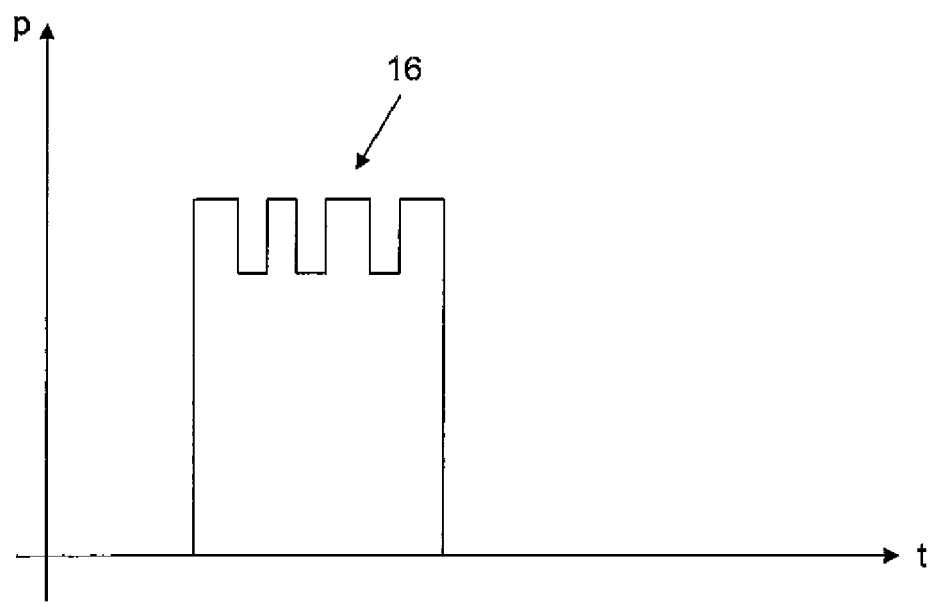
FIG. 3 is a possible transmission telegram of a read/write unit with a conditional sleep command.

It is important that the read/write unit, according to FIG. 3, for example, sends a coded transmission telegram 16 which, in the case of the present exemplary embodiment, is structured as an amplitude-modulate transmission telegram. Of course, the invention is not restricted to this. The invention is not restricted to transmitting amplitude-modulated transmission telegrams, because all possible communication methods that are part of the state of the art can be used. For example, frequency-modulated, phase-modulated, or amplitude-modulated transmission telegrams can be used. Likewise, transmission can take place using the time-slot method and the like.

Figure 4:
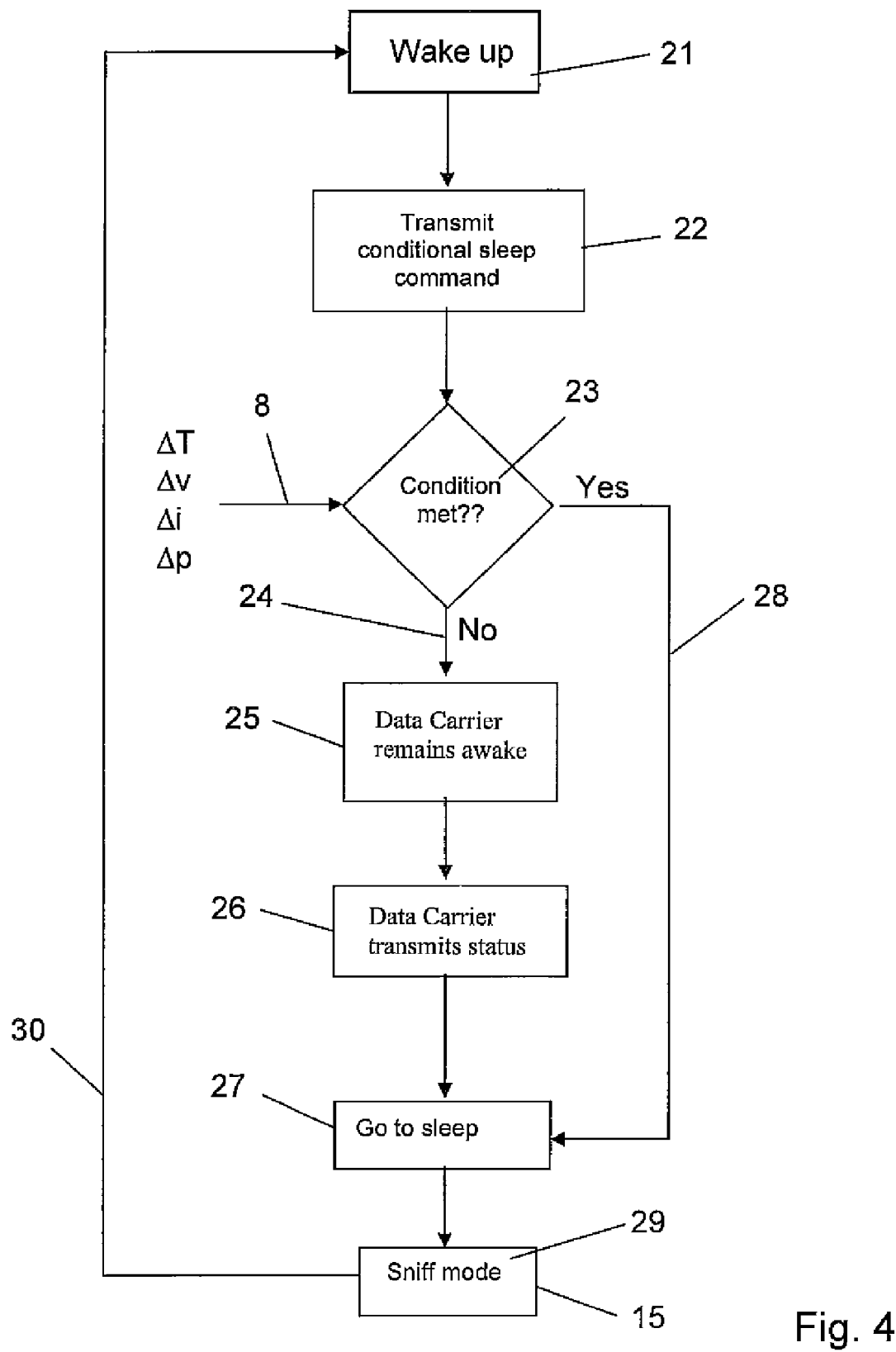
FIG. 4 is a decision tree or flow chart for the sequence of the steps of the method of the present invention.

A flow chart of the sequence of steps of the method of the invention is shown in FIG. 4.

First, wake-up signal 10 is sent to all the data carriers 6 at position 21. At position 22, read/write unit 2 sends the conditional sleep command.

The conditional sleep command is evaluated in every data carrier 6, and a check takes place at position 23 to determine whether or not the condition is met. This takes place with a query to the sensor 8 disposed on data carrier 6, in each instance, and as a function of whether or not the condition was met, a check then takes place at position 23 to determine whether or not the condition was met. If the condition was not met at position 24, then the data carrier remains awake at position 25, and is ready for further reception commands. For example, it can be requested, at position 26, to send a status report with its identification number.

Once it has carried out these steps, the awake data carrier can run through a number of other command processing steps. Then a sleep command can again be sent, at position 27, to data carrier 6 that lies outside of the conditions.

If, on the other hand, the data carrier fulfills the condition at position 28 from position 23, it is directly put into sleep mode 13 or into reception mode 15, respectively. This is indicated at position 29.

Thus, if the data carriers 6 are in the sniff mode 15, the data carrier can be awakened at any time, by way of the decision branch 30, by means of a wake-up command at position 21.

The advantage of the present invention lies in that it is now sufficient to query only specific critical data carriers, and that all the other data carriers remain quiet and do not communicate with the read/write unit in undesirable manner. This increases the speed of data transmission, on the one hand, because only a few data carriers are queried and transmit their critical values, while all the other data carriers are in sleep mode or conditional sleep mode, and in this connection the battery life is significantly increased.

It was found that the battery life is greater by a factor of 2 to 1,000 than compared with a data carrier that constantly transmits and receives.

What is claimed is:

1. A method for power-saving operation of a plurality of RFID data carriers, whereby each RFID data carrier has a transmission and reception antenna, by way of which data are sent to and received from a read/write unit by means of a radio signal, and the data carrier is configured for reception of an energy-saving signal that puts the data carrier into a sleep mode, the method comprising:

transmitting a wake-up signal to the RFID data carriers;

sending a conditional sleep command from the read/write unit to the RFID data carriers;

receiving and evaluating the conditional sleep command by each RFID data carriers;

receiving an input to each RFID data carrier from a sensor connected to each RFID data carrier, wherein the RFID data carriers perform monitoring of one or more physical variables by means of the sensors and wherein the RFID data carriers are disposed in groups, and the RFID data carriers monitor different sensor inputs by group;

detecting status/data in each RFID data carrier depending on the sensor input;

comparing, in each RFID data carrier, the conditional sleep command with the status/data detected by the RFID data carrier;

setting the RFID data carrier into direct sleep mode or into sniff mode, if stored conditions of the RFID data carrier agree with sensor conditions;

holding the RFID data carrier in the awake mode for a predetermined period of time if stored conditions of the RFID data carrier do not agree with the sensor conditions;

transmitting, by the read/write unit, a status query to the RFID data carrier in the awake mode;

transmitting a status response of the RFID data carrier in the awake mode to the read/write unit;

transmitting, by the read/write unit, a further sleep command to the RFID data carrier in the awake mode after receiving the status response, which does not demonstrate any agreement with the conditions; and waking up the RFID data carrier if receiving a further wake up command.

2. The method according to claim 1, wherein the physical variable is selected from the group consisting of speed monitoring, temperature monitoring, acceleration, movement, moisture monitoring, light intensity monitoring, and monitoring of other sensors.

3. The method according to claim 1, wherein the receiver of each RFID data carrier, proceeding from the sleep mode, switches over to reception for a brief time and goes into the reception mode.

4. The method according to claim 3, wherein the brief time is about 1 µs.

5. The method according to claim 1, and further comprising sending a wake-up signal to all the RFID data carriers, which therefore go into an awake mode and are ready to receive further commands.

6. The method according to claim 5, wherein the further commands comprise the conditional sleep command.

7. The method according to claim 1, wherein when agreement exists between the arriving, conditional sleep command to the data carrier and an existing sensor condition, no unnatural monitoring state exists, and the RFID data carrier switches over to the sleep mode.

8. The method according to claim 1, wherein after the conditional sleep command has arrived, the RFID data carrier switches over to an unconditional sleep mode for a defined period of time.

9. The method according to claim 1, wherein after the conditional sleep command has arrived, the RFID data carrier switches over to the reception mode for a defined period of time.

10. The method according to claim 1, wherein when an undesirable measurement value of the sensor exists in comparison with the arriving sleep command, the RFID data carrier switches over to the awake mode.

11. The method according to claim 10, wherein undesirable measurement values are selected from the group consisting of high/low temperature, incident light, noise, acceleration, movement, and moisture.

12. The method according to claim 1, wherein in the awake mode, the RFID data carrier is ready for reception of a status query from the read/write unit, and responds to it with a status response to the read/write unit, and subsequently switches over to the an unlimited sleep mode or reception mode.

13. The method according to claim 1, wherein the read/write unit sends a coded transmission telegram, selected from the group consisting of an amplitude-modulated, frequency-modulated, phase-modulated transmission telegram, and one that is sent using a time-slot method.

14. Apparatus for power-saving operation of a plurality of RFID data carriers by working according to the method of claim 1, the apparatus comprising:

a read/write unit;

a transmission/reception antenna coupled to said read/write unit by which signals are transmitted to and received from said RFID data carriers by means of a radio signal;

each said RFID data carrier having a transmission and reception antenna for receiving signals from and transmitting signals to said transmission and reception antenna of said read/write unit; and means in each said RFID data carrier for receiving an energy-saving sleep command signal that puts said RFID data carrier into a sleep mode;

wherein said RFID data carrier has a transmission and reception antenna that selectively transmits a transmission telegram to a transmission and reception antenna of said read/write unit and receives a transmission telegram from said read/write unit;

wherein the read/write unit transmits signals in the form of commands or queries to the RFID data carrier within a transmission and/or reception field, which signals are configured as a sleep command, as a wake-up signal, or as a status query, whereby the data carrier transmits signals in the form of a status response to the read/write unit; and wherein the sleep command transmitted by the read/write device forms a sleep mode of the data carrier which guarantees power-saving operation of the data carrier.

15. The method according to claim 1, wherein in one group the RFID data carriers monitor light sensors, in a second group the RFID data carriers monitor noise sensors, in a third the RFID data carriers monitor moisture sensors, and in a fourth group the RFID data carriers monitor temperature sensors.

16. The method according to claim 1, wherein a separate read/write unit is provided for each group, and that these read/write units transmit sequentially, that is, not all at the same time, but rather consecutively.

17. The method according to claim 1, wherein a single read/write unit issues a plurality of different conditional sleep commands, which are dependent on parameters including temperature, moisture, and speed, whereby the signal sent, in each instance, which contains one of the different conditional sleep commands, is evaluated by respective one or more of the RFID data carriers that monitor precisely the corresponding sensor input.

* * * * *